Figure 1:
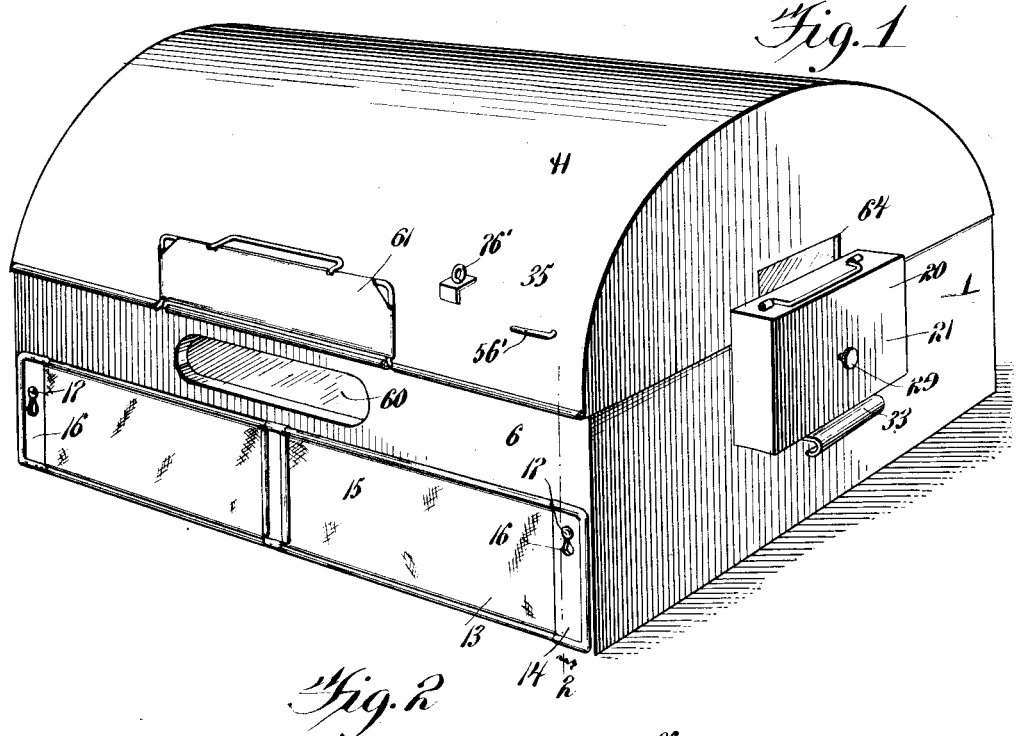

H. A. TEEGARDEN.
COMBINED INCUBATOR AND BROODER.
APPLICATION FILED MAR. 16, 1912.

1,086,954.

Patented Feb. 10, 1914.
3 SHEETS—SHEET 1.

Witnesses
W. S. McDowell
John J. McCarthy

Inventor
Henry A. Teegarden
By Victor J. Evans
Attorney

H. A. TEEGARDEN.
COMBINED INCUBATOR AND BROODER.
APPLICATION FILED MAR. 16, 1912.
1,086,954.
Patented Feb. 10, 1914.
3 SHEETS—SHEET 2.
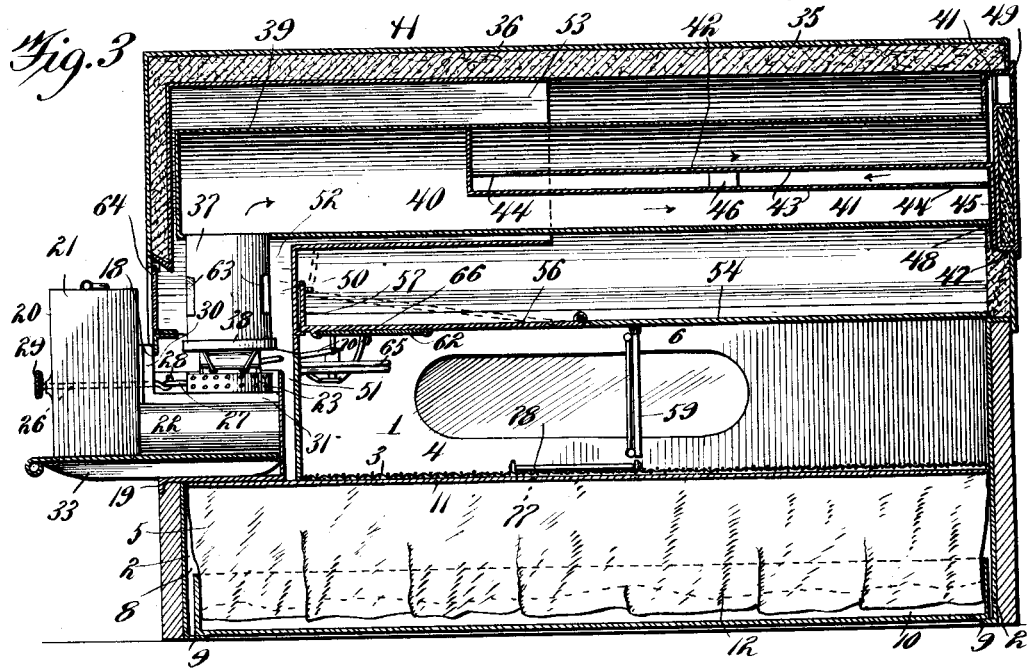
Inventor
Henry A. Teegarden
Witnesses
W. S. McDowell
John J. McCarthy
By Victor J. Evans
Attorney H. A. TEEGARDEN.
COMBINED INCUBATOR AND BROODER.
APPLICATION FILED MAR. 16, 1912.
1,086,954.
Patented Feb. 10, 1914.
3 SHEETS—SHEET 3.
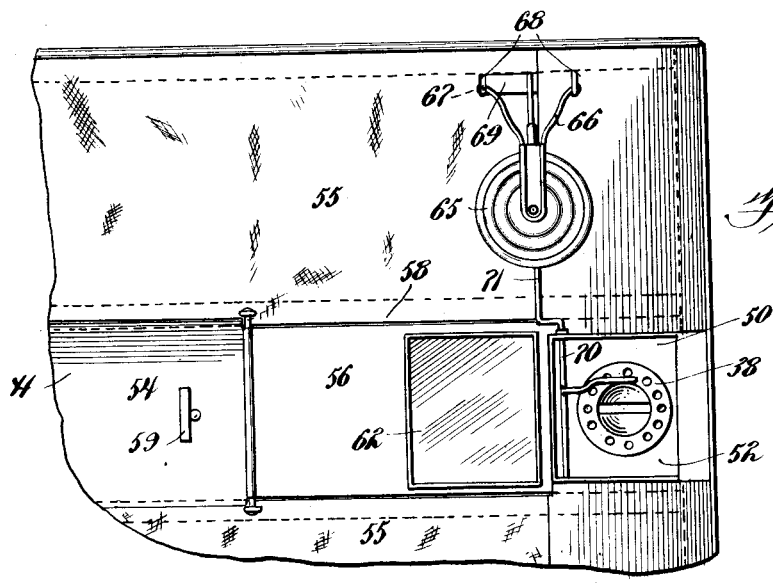
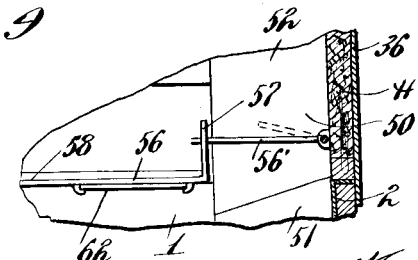
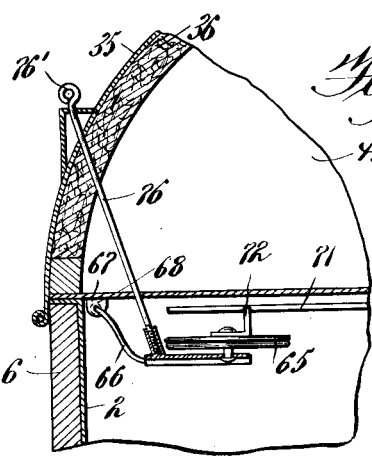
Witnesses
W. S. McDowell
John J. McCarthy
Inventor
Henry A. Teegarden
By Victor J. Evans
Attorney

UNITED STATES PATENT OFFICE.

HENRY A. TEEGARDEN, OF UNION CITY, INDIANA.

COMBINED INCUBATOR AND BROODER.

1,086,954.
Specification of Letters Patent.
Patented Feb. 10, 1914.

Application filed March 16, 1912. Serial No. 684,240.

*To all whom it may concern:*

Be it known that I, HENRY A. TEEGARDEN, a citizen of the United States of America, residing at Union City, in the county of Randolph and State of Indiana, have invented new and useful Improvements in Combined Incubators and Brooders, of which the following is a specification.

This invention relates to improvements in incubators and brooders.

In carrying out my invention, it is my purpose to provide a combined incubator and brooder wherein the incubating and brooding operation may be carried on simultaneously or separately.

Furthermore, I aim to provide an apparatus of this character which shall include a heater constructed in such manner that the fumes and heated air from the lamp or other source of heat may be utilized and retained therein to give up their maximum calorific values without entering the heating chamber proper.

It is also my purpose to provide an apparatus of this type wherein the lamp or other source of heat may be automatically controlled by the temperature within the heating chamber to reduce or increase the heating capacity of such source of heat according to the temperature of the air within the heating chamber, thereby obviating the necessity of permitting the heated air to escape from the heating chamber and consequently the chilling of such chamber.

A further object of my invention is the provision of an incubator embodying among other features an egg chamber, a heating chamber surmounting the egg chamber and a horizontal partition carried by the heating chamber and interposed between the latter and the egg chamber and including a pivoted member normally lying in partition formation, a thermometer being suspended from said partition within the egg chamber, while a mirror is carried by the pivoted member in proximity to the burner of the incubator so that when the pivoted member is swung upwardly the mirror will be in a position to receive the light rays from the lamp and deflect the same onto the thermometer thereby enabling the same to be read with ease and facility.

With the above and other objects in view, the invention consists in the construction, combination and arrangement of parts hereinafter set forth in and falling within the scope of the appended claims.

Figure 2:
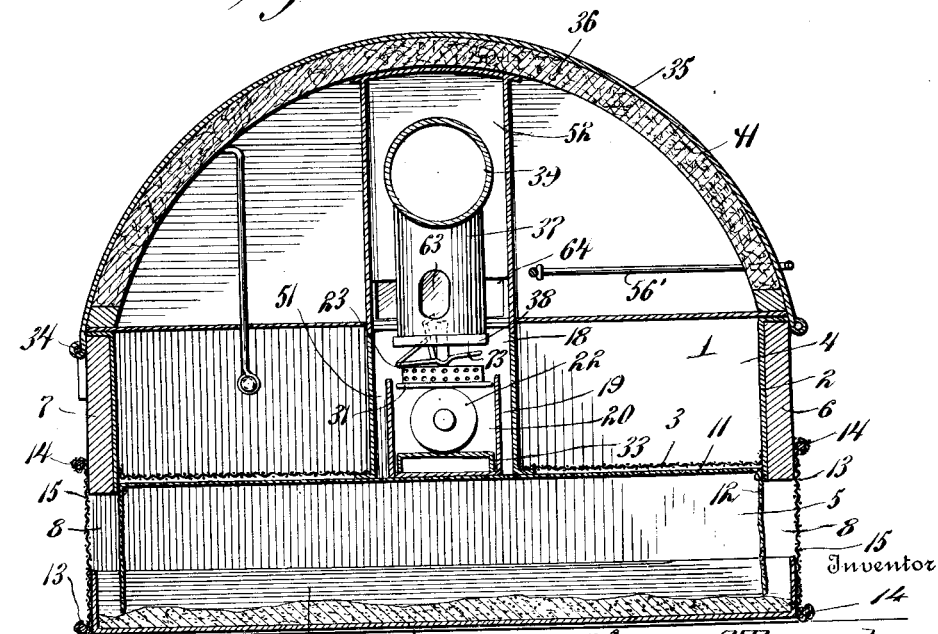

In the accompanying drawings there has been illustrated one practical embodiment of my invention and in these drawings Figure 1 is a perspective view of a combined incubator and brooder constructed in accordance with the present invention. Fig. 2 is a transverse section on the line 2—2 of Fig. 1. Fig. 3 is a central longitudinal vertical sectional view of the same. Fig. 4 is a detail perspective view of the heater, the same being removed from the heating chamber. Fig. 5 is a perspective view of the lamp or heating element. Fig. 6 is a detail thereof, and Fig. 7 is a fragmentary bottom plan view of the heating chamber. Fig. 8 is a fragmentary sectional view of the heating chamber, the heat regulator being shown in elevation. Fig. 9 is a fragmentary section view of a detail of the heating chamber, and Fig. 10 is a fragmentary sectional view of a portion of the incubating chamber, the lamp being shown therein and in section.

Similar reference characters designate like parts throughout the several views.

Referring now to the accompanying drawings in detail, my combined incubator and brooder, as illustrated, embodies, among other features, a substantially rectangular frame or receptacle 1 constructed preferably of wood and having a lining 2 of metal or other suitable substance, and divided interiorly by means of a horizontal partition 3 arranged approximately centrally of the frame or receptacle to provide an upper egg chamber 4 and a lower brooding chamber 5, the partition 3 being constructed of foraminous material, such as wire screening or the like. The front and rear walls 6 and 7 respectively, of the receptacle 1, below the partition 3, are cut away to form openings 8 of a length corresponding to the similar dimension of the receptacle, and slidably mounted upon guides 9, 9 carried by the lower extremities of the side walls of the receptacle, is a brooding tray 10 adapted to contain a quantity of sand or the like material so as to provide a relatively soft covering for the bottom of such tray. Secured to the interior of the walls of the receptacle 1 and of an area equal to that of the receptacle, is a flexible covering 11 lying directly beneath the partition 3 and depending at its opposite longitudinal edges as at 12 to a point immediately adjacent the bottom of the brooding tray 10. The openings 8, 8 in the front and rear walls of the receptacle 1, are closed by means of covers 13, 13 each of a length corresponding to the similar dimension of its respective wall and comprising a metallic frame 14 covered by a suitable fabric 15 whereby air may be supplied to the brooding chamber, thence to the egg chamber through the covering 11 and partition 3, the frame 14 of each cover 13 being provided at its opposite ends with key hole slots 16 designed to receive the heads of screws 17 so that the covers may be securely fastened in their applied positions. It is conceivable, however, that this fastening means may be varied and any suitable device employed for this purpose.

Formed in one of the end walls of the egg chamber 4 is an opening 18 of substantially rectangular contour, and securely fastened to the walls of the opening 18 and extending inwardly of the receptacle 1 is a container 19 designed to coöperate with the walls of the opening to hold the heating element or lamp within such opening and the receptacle.

The heating element or lamp, is indicated at 20 and in the present instance is of the oil burning type and embodies a main oil reservoir or container 21, a supplemental reservoir 22 extending at right angles to the main reservoir and in communication therewith, and a burner 23 threaded into an aperture 24 in the supplemental reservoir 22, which burner is provided with a wick 25, the burner carrying the well known wick wheels or the like for raising and lowering the wick. Projecting through the main reservoir 21, is a rod 26 detachably connected to the stem 27 of the wick raising and lowering device through the medium of a hook and eye connection 28, such connection serving to facilitate the removal of the burner from the supplemental reservoir, the opposite extremity of the rod 26 terminating in a manipulating disk 29 by means of which the wick may be raised and lowered at will. Secured to the side of the main reservoir 21 adjacent the supplemental reservoir 22 and spaced from the said main reservoir is a retaining plate 30 provided with a right angular portion 31 formed with an opening 32 so that the said right angular portion of the plate may be secured to the supplemental reservoir adjacent the burner. This heating element or lamp 20 is adapted to be slid through the opening 18 in the receptacle 1 and into the container 19, the right angular portion 31 of the plate 30 being of a width corresponding to the similar dimension of the container 19 and the plate 30 being of a width greater than that of the opening 18 so that the said plate may engage the walls of the opening 18 exteriorly of the receptacle 1 and hold the main reservoir spaced from such receptacle thereby permitting the free circulation of air about the burner. Subsequent to the sliding of the burner within the opening and container, the said burner is moved vertically or upwardly within the opening and container, and a slide 33 positioned beneath the burner so as to prevent accidental displacement of the same from the opening.

Mounted upon the upper portion of the receptacle 1 above the egg chamber 4 and in communication with such chamber, is a heating chamber H, which chamber is connected to the receptacle 1 in any suitable manner, as by hinges 34. This heating chamber is preferably of semicircular contour in cross section, as shown, and consists of an outer covering 35 of metal, wood or the like provided with an interior lining or packing 36 of asbestos or other suitable heat insulating material so as to increase the heating efficiency of such chamber. Arranged within the heating chamber and extending vertically thereof and in alinement with the burner 23, is a chimney 37 carrying at its lower end a burner cap 38 and in open communication at its upper end with a heater 39 arranged longitudinally of the heating chamber and designed to retain the heated air and fumes of the lamp for a sufficient length of time to obtain the maximum amount of heat from such air and fumes. This heater 39, in the present instance, consists of an elongated cylindrical body 40 of a length equal to that of the heating chamber and communicating at one end with the chimney 37 and at its opposite end with the atmosphere by way of a pipe 41. Arranged within the body 40 of the heater, is a deflector or heat circulating device 42 which in this embodiment of my invention, comprises a pair of spaced parallel plates 43 formed at their relatively opposite ends with openings 44. The end of each plate opposite the opening therein, is provided with a flange 45 adapted to receive the proximate extremity of the adjacent plate so that the plates may be securely fastened together in their assembled positions, a suitable support 46 being disposed between the plates intermediate their lengths so as to maintain said plates in spaced relation. This circulating device, is preferably of a length equal to half the similar dimension of the body 40 and is disposed longitudinally and centrally of such body, the flange 45 at the rear of the circulating device serving to close one half of the upper portion of the body against the other half of such body. Thus, it will be seen that the fumes from the lamp and the heated air are retained within the heater 39 to give up their maximum calorific values and the passage of the air through the heater may be briefly stated as follows:

The air leaving the lamp chimney 37 enters the body 40 of the heater 39, and passes longitudinally of such body beneath the lower of the plates 43, thence through the opening 44 of such plate and in a relatively reverse direction between both of the plates, the heat then passing through the aperture 44 in the upper plate and being discharged to the atmosphere through the pipe 41. This circulating device 42 is detachably associated with the body 40 of the heater 39 to enable cleaning of such circulating device, the said device being removable from the body 40 through an opening 47 in one of the end walls of the heating chamber H, such opening being closed by a removable cover 48 provided with openings 49 to carry off the heated gases after the latter have circulated through the heating chamber.

In order to supply air to the heating chamber H and permit such air to circulate around the burner and the heater 39 so that such air may become thoroughly heated, I have provided an air conduit 50 extending vertically and horizontally of the apparatus and in communication at one end with the atmosphere by way of the brooding chamber 5 and at its opposite end with the heating chamber H. This conduit 50 in the present instance consists of a casing composed of the sections 51 and 52, the former being arranged within the egg chamber and inclosing the container 19 and spaced therefrom, and the latter arranged within the heating chamber H and inclosing the lamp chimney 37 and spaced therefrom and provided with a right angular portion or section 53 arranged about the heater 39 and spaced from such heater and terminating preferably intermediate the length of the heating chamber H so that the heated air may be discharged into such chamber, thence downwardly and through the egg and brooding chambers. Immediately below the section 53 of the conduit 50 within the heating chamber H, the latter is provided with a central longitudinally arranged metallic partition 54, such partition acting as a deflector so as to bring about an even and uniform distribution of the heat to the egg and brooding chambers. Upon the opposite sides of the partition 54, the bottom of the heating chamber H is provided with a fabric covering 55, such as burlap or the like to facilitate the keeping of the heating chamber and consequently the brooding and egg chambers at a uniform temperature. The partition 54, adjacent the section 52 of the conduit 50 is provided with a hinged member 56 having an upturned flange 57 designed to normally close an opening 58 formed in the section 52 of the air conduit, the hinged member being movable to uncover the opening 58 so that light from the lamp may be projected into the egg chamber to ascertain the temperature of such chamber, a thermometer 59 being attached to the partition 54 beyond the hinged member 56 thereof and depending into the egg chamber 4 for this purpose, such thermometer being visible through an opening 60 in the front wall of the egg chamber 1, which opening has a cover of glass or other suitable transparent material and is normally closed by a cover 61 pivotally connected to the lower forward edge of the outer covering 35 of the heating chamber H. This hinged member 56 is preferably provided with a mirror 62 so as to facilitate the reading of the thermometer, while the lamp chimney 38 adjacent the opening 58 in the section 52 of the air conduit, is provided at diametrically opposite points with windows 63, one of which permits the passage of light into the egg chamber while the other has registration with a window 64 in the end wall of the heating chamber in proximity to the burner of the element 20 so that the burner of the lamp or such heating element may be readily seen. The hinged member 56 is operable from a shaft 56′ projecting outwardly of the heating chamber and connected to the flange 57 of the hinged member interiorly of the heating chamber whereby the hinged member may be swung out of its normal position for the purpose aforesaid, the release of such shaft permitting the hinged member to gravitate to its normal or partition forming position.

In acordance with the present invention, the temperature of the heating chamber is automatically controlled by regulating the burning of the lamp so that said lamp may be caused to give more or less heat according to the temperature of such chamber so as to avoid chilling the heating chamber by permitting the escape of the heated air therefrom. This heat regulating mechanism is thermostatically controlled and in the present instance embodies a diaphragm 65 capable of expansion under the action of the heat and mounted upon a yoke 66 the opposing arms of which yoke are outturned to provide trunnions 67 designed to be journaled in ears 68 interconnected through the medium of a strip 69 suitably fastened to the forward longitudinal edge of the heating chamber H, the diaphragm extending into the egg chamber. Journaled in bearings carried by the opposing side walls of the section 52 of the conduit 50 is a shaft 70 provided with an offset portion 71 resting upon a lug 72 carried by the upper surface of the diaphragm 65 and adapted to impart movement to the shaft 70 under the action of such diaphragm so as to control the burning of the lamp. Pivotally mounted upon the lamp burner in any suitable manner is a flame reducer 73 of such construction as to gravitate to an inoperative position and provided with a member 74 adapted to be engaged by an arm 75 carried by the shaft 70 so that the flame reducer 73 may be rendered operative to reduce the flame of the burner upon the expansion of the diaphragm 65 whereby the heating capacity of the lamp will be reduced, this action taking place when the temperature of the egg chamber goes above the normal or prescribed limit. A manually operable shaft 76 projects through the heating chamber and terminates exteriorly of such chamber in a manipulating handle 76′ and has connection with the yoke 66 of the diaphragm interiorly of said heating chamber and is designed for manual adjustment so that the temperature of the egg and heating chambers may reach a certain or prescribed limit before the diaphragm operates.

In order to establish communication between the egg chamber and the brooding chamber subsequent to the incubating operation, I have formed an opening 77 in the partition 3 immediately adjacent to the opening 60 in the front wall of the egg chamber, which opening is provided with a hinged cover 78 operable from the brooding chamber to establish communication between the egg and brooding chambers. The eggs within the incubating chamber may be held in spaced relation in any suitable manner if such is desired.

From the foregoing description taken in connection with the accompanying drawings, the construction and mode of operation of my invention will be readily apparent and while I have herein shown and described one form of my invention by way of illustration, it is to be understood that I do not limit myself to the exact details of construction herein described and delineated, as modification and variation may be made within the scope of the claims and without departing from the spirit of the invention.

I claim:

1. An incubator comprising a brooding chamber, an egg chamber disposed above the brooding chamber, a burner disposed within said egg chamber, a heating chamber surmounting the egg chamber and hingedly connected thereto, a chimney surrounding said burner and extending into said heating chamber, a heater disposed within said heating chamber and arranged longitudinally thereof and in communication with said burner, an air conduit surrounding said chimney and burner and comprising a horizontal portion surrounding said heater, and a vertical portion surrounding said burner and chimney and composed of two sections, means for regulating the flame of the burner, and means responsive to the temperature of the heating chamber and controlling said last means.

2. In an incubator, an egg chamber, a heating chamber, a horizontal partition carried by said heating chamber and interposed between the latter and the egg chamber and including a pivoted member normally lying in partition formation, a thermometer depending from said partition into said egg chamber, a mirror carried by said pivoted member, a burner disposed in proximity to said partition, a chimney surrounding said burner and provided with sight holes, and means for swinging said pivoted member whereby the mirror will be disposed in a position to receive the light rays from the lamp and deflect the same onto said thermometer so that the latter may be read.

In testimony whereof I affix my signature in presence of two witnesses.

HENRY A. TEEGARDEN.

Witnesses:
Don C. Ward,
Melle Wall.